US011844330B2

(12) United States Patent
Allami

(10) Patent No.: US 11,844,330 B2
(45) Date of Patent: Dec. 19, 2023

(54) PAW-WEAR FOR CLAWED ANIMALS AND METHODS OF FITTING THE PAW-WEAR TO THE CLAWED ANIMALS

(71) Applicant: Timothy Allami, Portland, OR (US)

(72) Inventor: Timothy Allami, Portland, OR (US)

( * ) Notice: Subject to any disclaimer, the term of this patent is extended or adjusted under 35 U.S.C. 154(b) by 629 days.

(21) Appl. No.: 16/576,563

(22) Filed: Sep. 19, 2019

(65) Prior Publication Data
US 2020/0093095 A1 Mar. 26, 2020

Related U.S. Application Data

(60) Provisional application No. 62/734,672, filed on Sep. 21, 2018.

(51) Int. Cl.
*A01K 13/00* (2006.01)
*A43C 11/14* (2006.01)
*A43B 3/00* (2022.01)

(52) U.S. Cl.
CPC .............. *A01K 13/007* (2013.01); *A43B 3/00* (2013.01); *A43C 11/1493* (2013.01)

(58) Field of Classification Search
CPC ...... A01K 13/007; A01K 13/006; A43B 3/00; A43C 11/1493; B68B 7/00; B68C 5/00
See application file for complete search history.

(56) References Cited

U.S. PATENT DOCUMENTS

| 28,218 | A | * | 5/1860 | Valkenburgh | A01L 3/06 168/5 |
| 6,546,704 | B1 | * | 4/2003 | Fisher | A01K 13/007 54/82 |
| D832,530 | S | * | 10/2018 | Hansen | D30/146 |
| 2013/0152873 | A1 | * | 6/2013 | VerHoef | A01K 15/02 119/726 |
| 2014/0059892 | A1 | * | 3/2014 | Kosanke | A01K 13/007 36/111 |

FOREIGN PATENT DOCUMENTS

| DE | 202009000763 U1 | * | 6/2009 | ........... A01K 13/007 |
| DE | 202009016572 U1 | * | 5/2011 | ........... A01K 13/007 |
| KR | 20130006410 U | * | 11/2013 | |
| WO | WO-2008132730 A2 | * | 11/2008 | ........... A01K 13/007 |
| WO | WO-2013180826 A1 | * | 12/2013 | ........... A01K 13/007 |
| WO | WO-2014071462 A1 | * | 5/2014 | ........... A01K 13/007 |

* cited by examiner

*Primary Examiner* — Son T Nguyen

(57) ABSTRACT

Paw-wear for clawed animals and methods of fitting the paw-wear to the clawed animals. The paw-wear includes a sole and an upper. The sole includes an outer sole surface and an inner sole surface. The upper is shaped to at least partially surround the paw and to selectively retain the paw-wear on the paw. In some examples, the upper is configured to transition between a fitted configuration and an unfitted configuration. When in the fitted configuration, the upper is shaped to at least partially surround the paw and to retain the paw-wear on the paw. When in the unfitted configuration, the upper is shaped to permit the paw to engage the inner sole surface without surrounding the paw or retaining the paw in the paw-wear. In some examples, claws of the paw are exposed when the upper at least partially surrounds the paw and retains the paw-wear on the paw.

12 Claims, 8 Drawing Sheets

PAW-WEAR FOR CLAWED ANIMALS AND METHODS OF FITTING THE PAW-WEAR TO THE CLAWED ANIMALS

RELATED APPLICATION

This application claims priority to U.S. Provisional Patent Application No. 62/734,672, which was filed on Sep. 21, 2018, and the complete disclosure of which is hereby incorporated by reference.

FIELD OF THE DISCLOSURE

The present disclosure relates generally to paw-wear for clawed animals and/or to methods of fitting the paw-wear to the clawed animals.

BACKGROUND OF THE DISCLOSURE

Clawed animals, such as dogs, have paws that differ significantly from human feet. As an example, the pads of a dog's paws differ significantly from the bottom of human feet. As another example, the shape and/or function of a dog's toes and/or pads differs significantly from the shape and/or function of human toes and/or heels. As yet another example, dogs may utilize their claws to grip surfaces, while human feet do not have a corresponding structure. As yet another example, a dog's paws may sweat in order to protect the dog's paws from hot surfaces, as opposed to human feet, which sweat as a cooling mechanism. As another example, dogs may utilize their paws in a manner that is significantly different from how humans utilize their feet.

With the above in mind, a dog's paw-wear needs also may differ significantly from a human's footwear needs. However, conventional dog paw-wear design generally does not consider the above distinctions and often takes the form of balloon-shaped rubber enclosures, of shoes, and/or boots that would be more readily worn by small people than by dogs. This conventional dog paw-wear may be uncomfortable for the dog to wear, may be frightening to the dog when positioned on the dog's paws, and/or may impede the dog's ability to utilize its paws and/or claws in a natural and/or effective manner. Thus, there exists a need for improved paw-wear for clawed animals.

SUMMARY OF THE DISCLOSURE

Paw-wear for clawed animals and methods of fitting the paw-wear to the clawed animals. The paw-wear includes a sole and an upper. The sole includes an outer sole surface and an inner sole surface. The upper is shaped to at least partially surround the paw and to selectively retain the paw-wear on the paw. In some examples, the upper may be configured to transition between a fitted configuration and an unfitted configuration. When in the fitted configuration, the upper may be shaped to at least partially surround the paw and to retain the paw-wear on the paw. When in the unfitted configuration, the upper may be shaped to permit the paw to engage the inner sole surface without surrounding the paw and/or without retaining the paw in the paw-wear. In some examples, the paw-wear may be configured such that claws of the paw are exposed when the upper at least partially surrounds the paw and retains the paw-wear on the paw.

The methods include positioning a paw of the clawed animal in contact with an inner sole surface of a sole of the paw-wear and fastening an upper of the paw-wear to at least partially surround the paw with the upper and/or to retain the paw-wear on the paw with the upper. The fastening may include fastening such that claws of the paw extend external the paw-wear.

DETAILED DESCRIPTION AND BEST MODE OF THE DISCLOSURE

Figure 1:
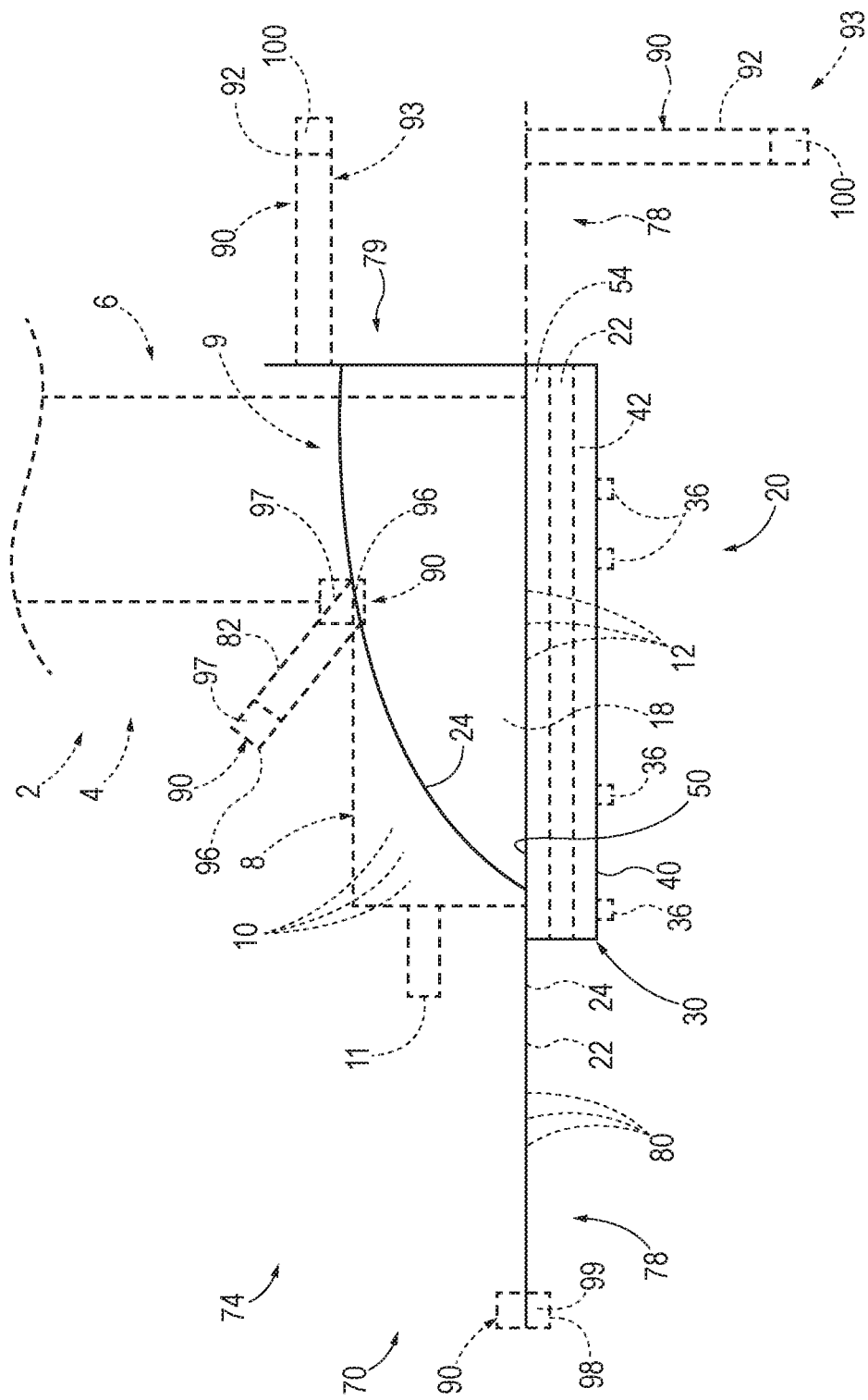
FIG. 1 is a schematic illustration of examples of paw-wear, according to the present disclosure, for clawed animals and illustrating the paw-wear in an unfitted configuration.

FIGS. 1-8 provide examples of paw-wear 20, according to the present disclosure, for clawed animals and/or of methods 200, according to the present disclosure, of fitting paw-wear to a clawed animal. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 2:
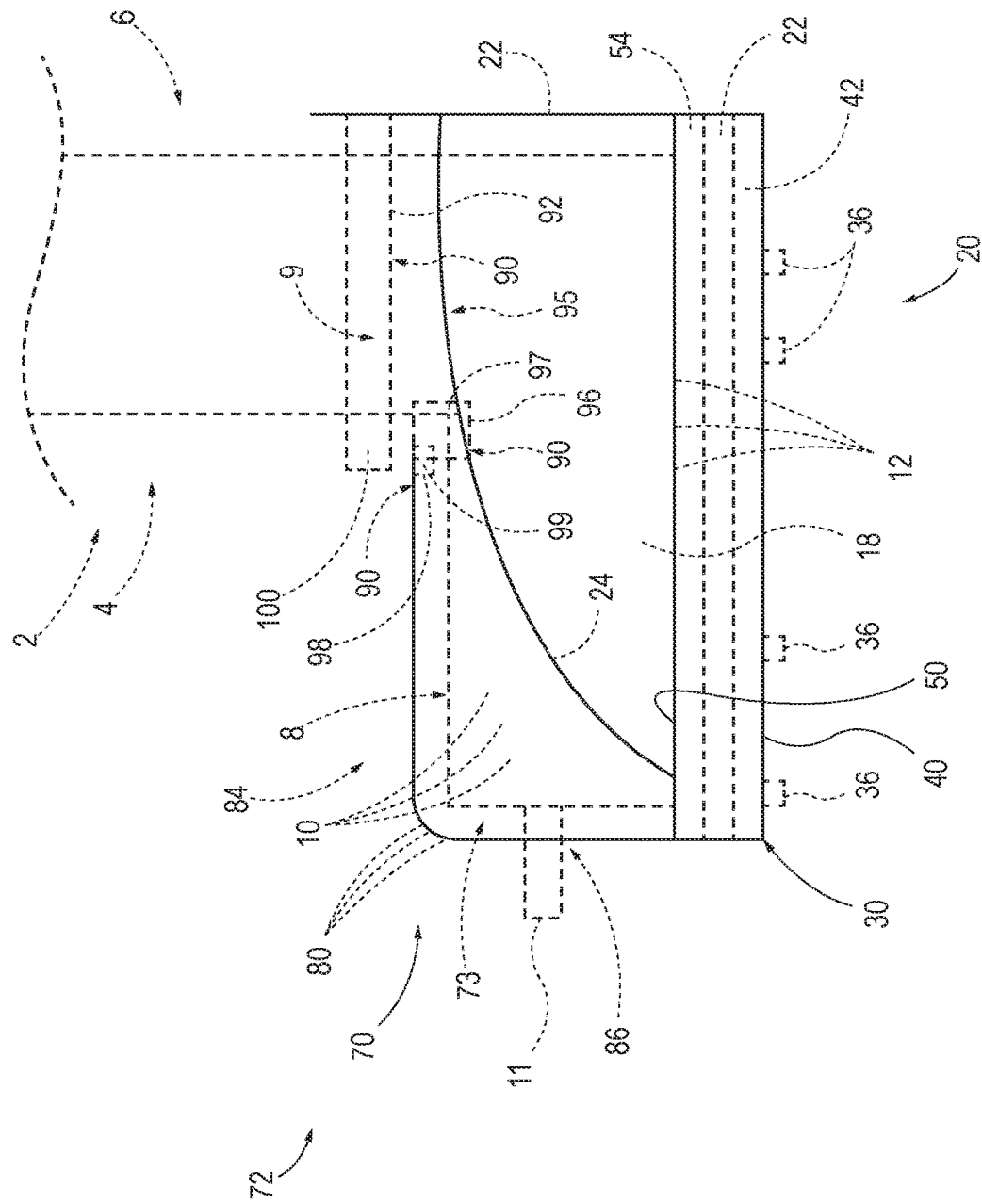
FIG. 2 is a schematic illustration of examples of paw-wear, according to the present disclosure, for clawed animals and illustrating the paw-wear in a fitted configuration.

FIG. 1 is a schematic illustration of examples of paw-wear 20, according to the present disclosure, for clawed animals 2 and illustrating the paw-wear in an unfitted configuration 74. FIG. 2 is a schematic illustration of examples of paw-wear 20, according to the present disclosure, for clawed animals 2 and illustrating the paw-wear in a fitted configuration 72. FIGS. 3-7 are less schematic views of an example of paw-wear 20 according to the present disclosure. Paw-wear 20 also may be referred to herein as footwear 20, shoes 20, boots 20, booties 20, paw protectors 20, paw pad protectors 20, paw covers 20, and/or paw pad covers 20.

As illustrated collectively by FIGS. 1-7, and with more specific reference to FIGS. 1-2, paw-wear 20 is configured to be worn by clawed animal 2, such as a dog 4. For simplicity, the present disclosure refers to paw-wear 20 in the context of dog 4: however, it is within the scope of the present disclosure that paw-wear 20 may be utilized with, utilized by, and/or worn by any suitable clawed animal 2, and references to a dog and/or to dog 4 may be replaced by references to a clawed animal and/or to clawed animal 2 without departing from the scope of the present disclosure. Examples of other clawed animals 2 that may wear and/or utilize paw-wear 20 include felines, canids, rabbits, bears, raccoons, mustelids, and/or rodents.

As illustrated in dashed lines in FIGS. 1-2, dog 4 includes a leg 6 that includes a paw 8. Paw 8 includes a plurality of digits 10, which also may be referred to herein as toes 10, and at least a subset of digits 10 may include an associated claw 11. Claw 11 also may be referred to herein as a toenail 11 and/or as a nail 11.

Paw 8 also includes a palm 18, which also may be referred to herein as a metacarpal, such as when present on a front paw 8 of the dog, or as a metatarsal, such as when present on a rear paw 8 of the dog. Paws 8 also include a plurality of pads 12, which may be positioned on a bottom surface of each digit 10 and/or of palm 18.

As illustrated in solid lines in FIGS. 1-2, paw-wear 20, which is configured to be worn on paw 8, includes a sole 30 and an upper 70. Sole 30 includes an outer sole surface 40 and an inner sole surface 50, which may be sized, shaped, and/or configured to receive pads 12 of paw 8.

Figure 5:
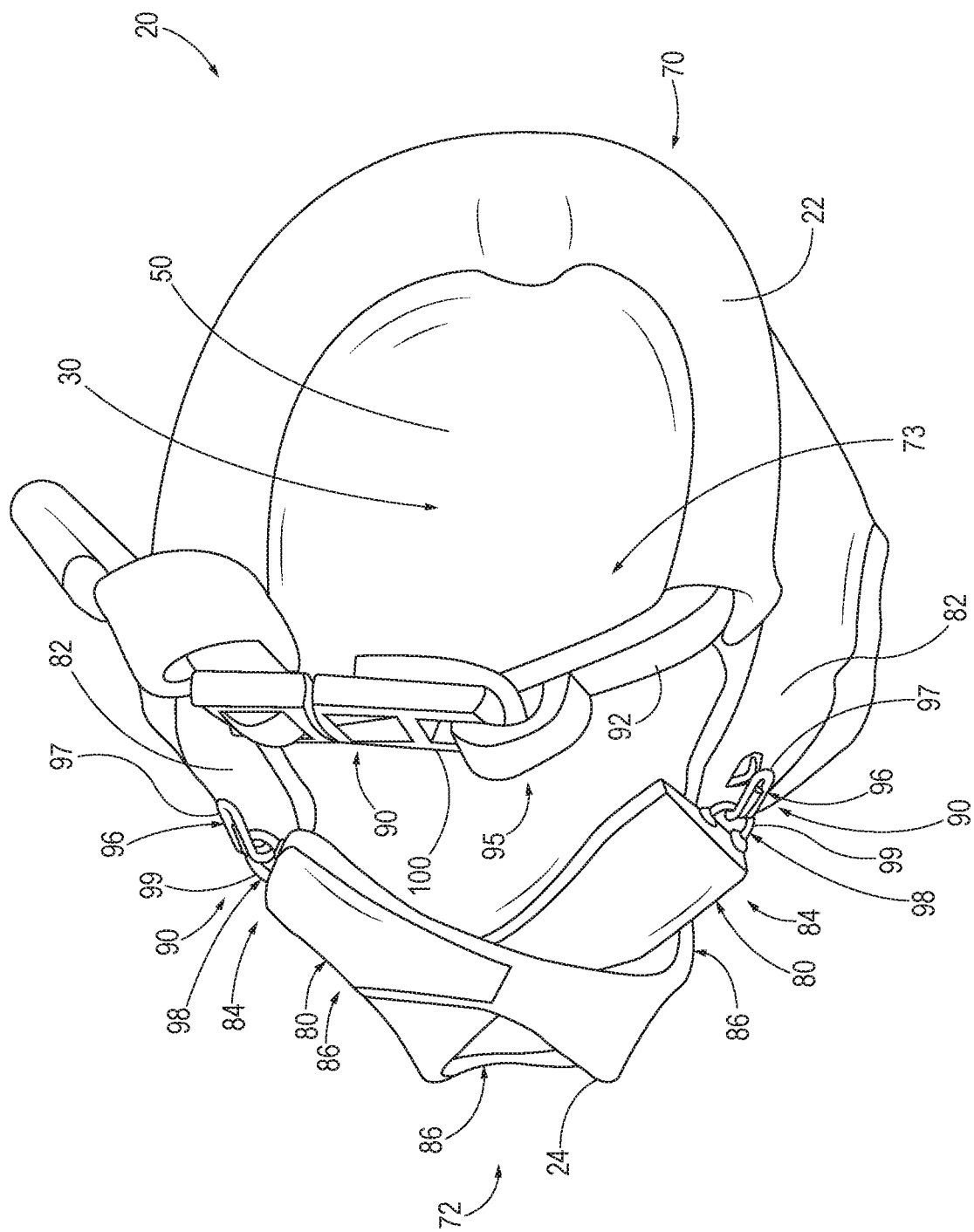
FIG. 5 is a less schematic top view illustrating an example of paw-wear in a fitted configuration, according to the present disclosure.
Figure 6:
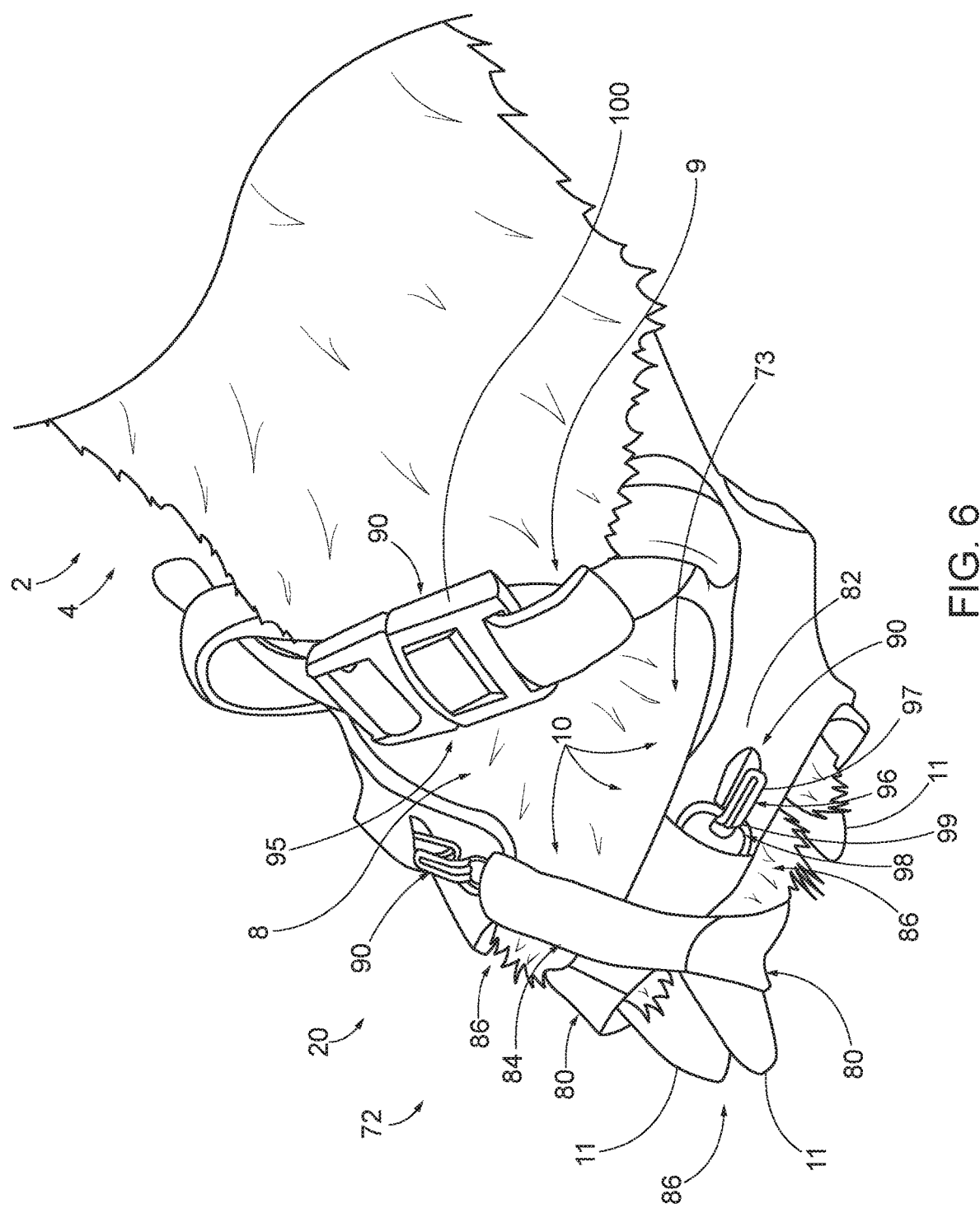
FIG. 6 is a less schematic top view illustrating an example of paw-wear, according to the present disclosure, fitted to a dog's leg.

Upper 70 may include regions and/or portions of paw-wear 20 that extend from sole 30 and/or that covers and/or retains the top, sides, and back of paw 8 and/or the regions of paw 8 that are not received by inner sole surface 50 of sole 30. Upper 70 may be sized, shaped, and/or configured to at least partially surround paw 8 and/or to selectively retain the paw-wear on the paw when paw-wear 20 is in fitted configuration 72, such as is illustrated in FIGS. 2 and 5-6.

Figure 3:
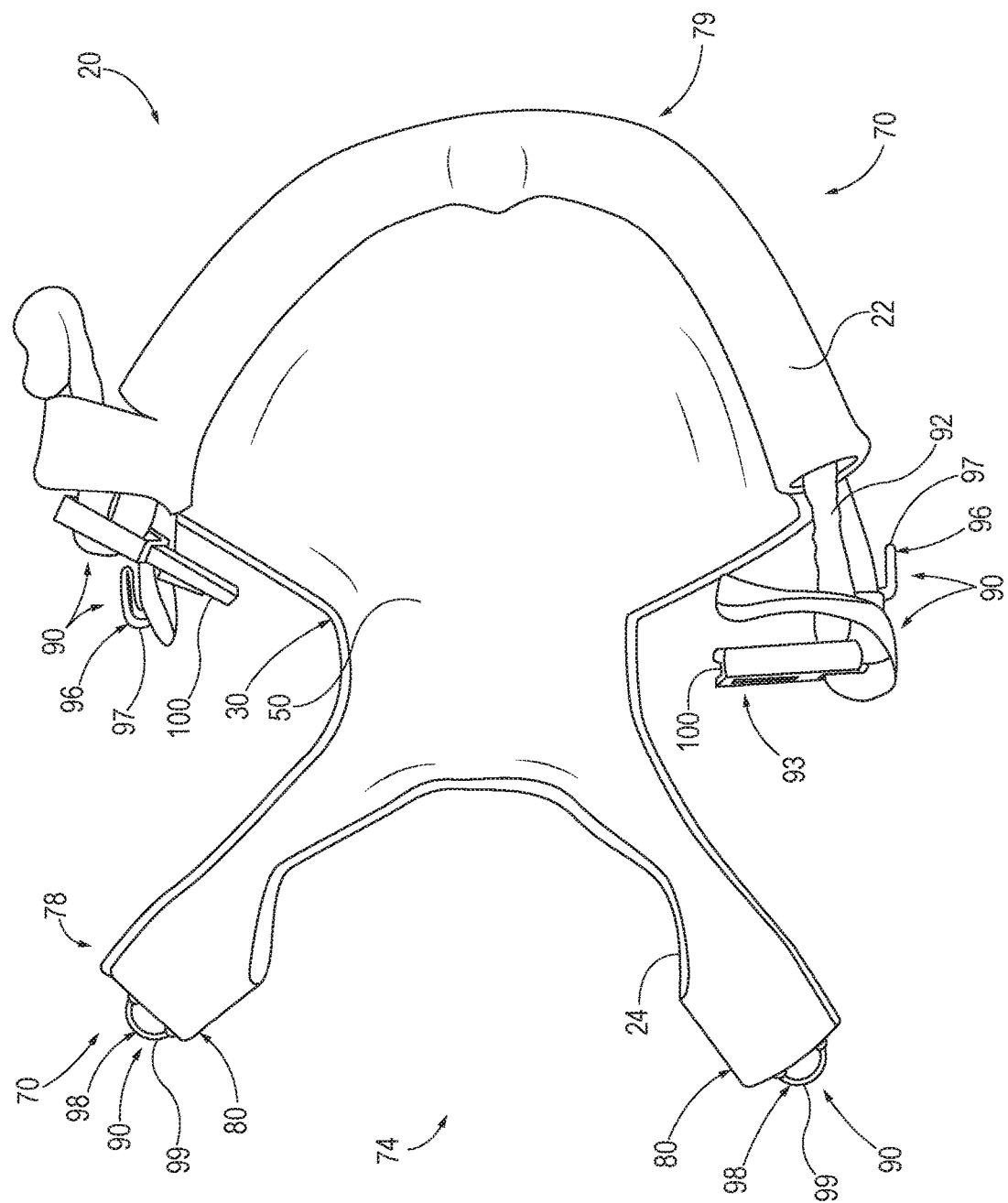
FIG. 3 is a less schematic top view illustrating an example of paw-wear in an unfitted configuration, according to the present disclosure.
Figure 4:
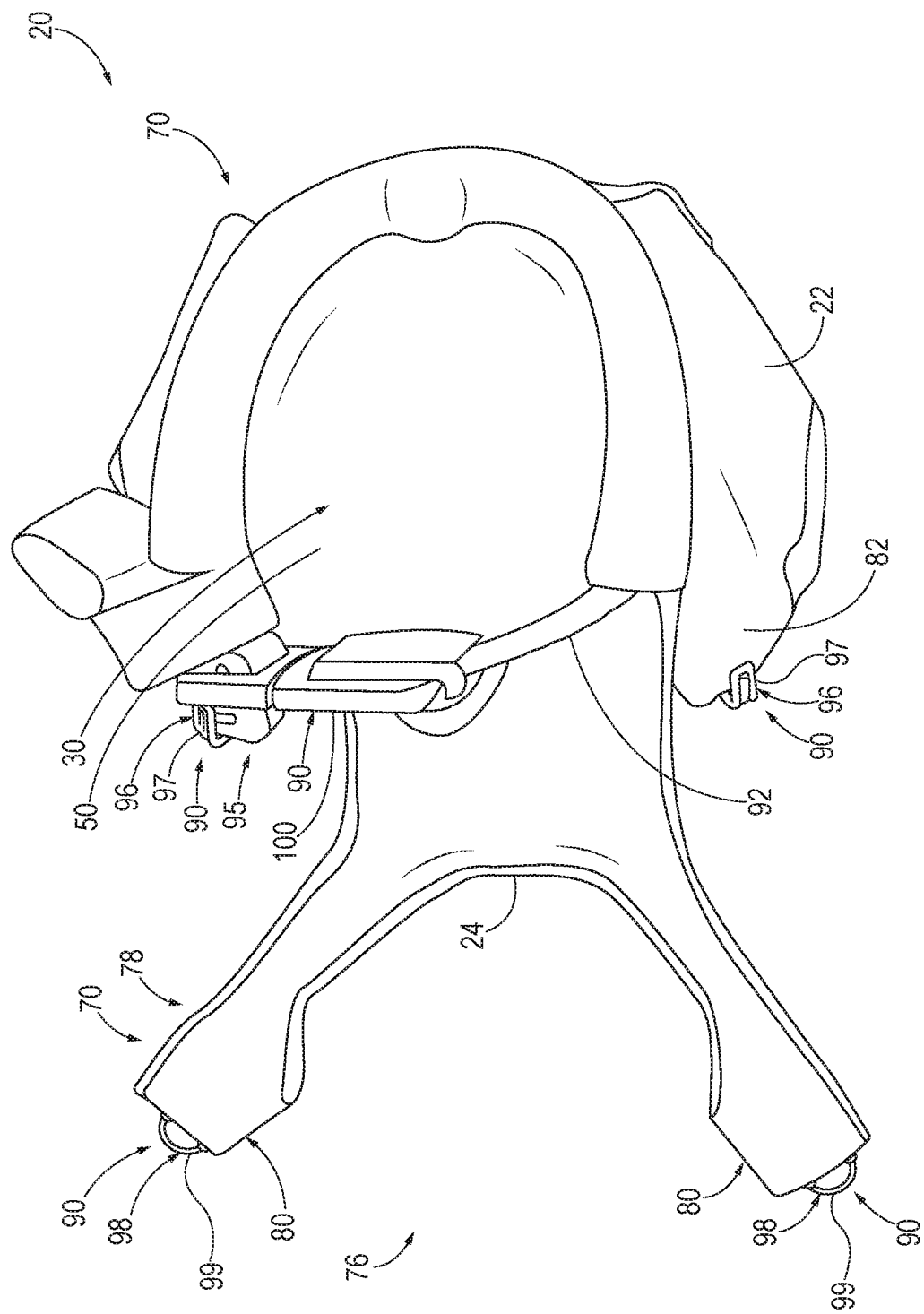
FIG. 4 is a less schematic top view illustrating an example of paw-wear in a partially fitted configuration, according to the present disclosure.
Figure 7:
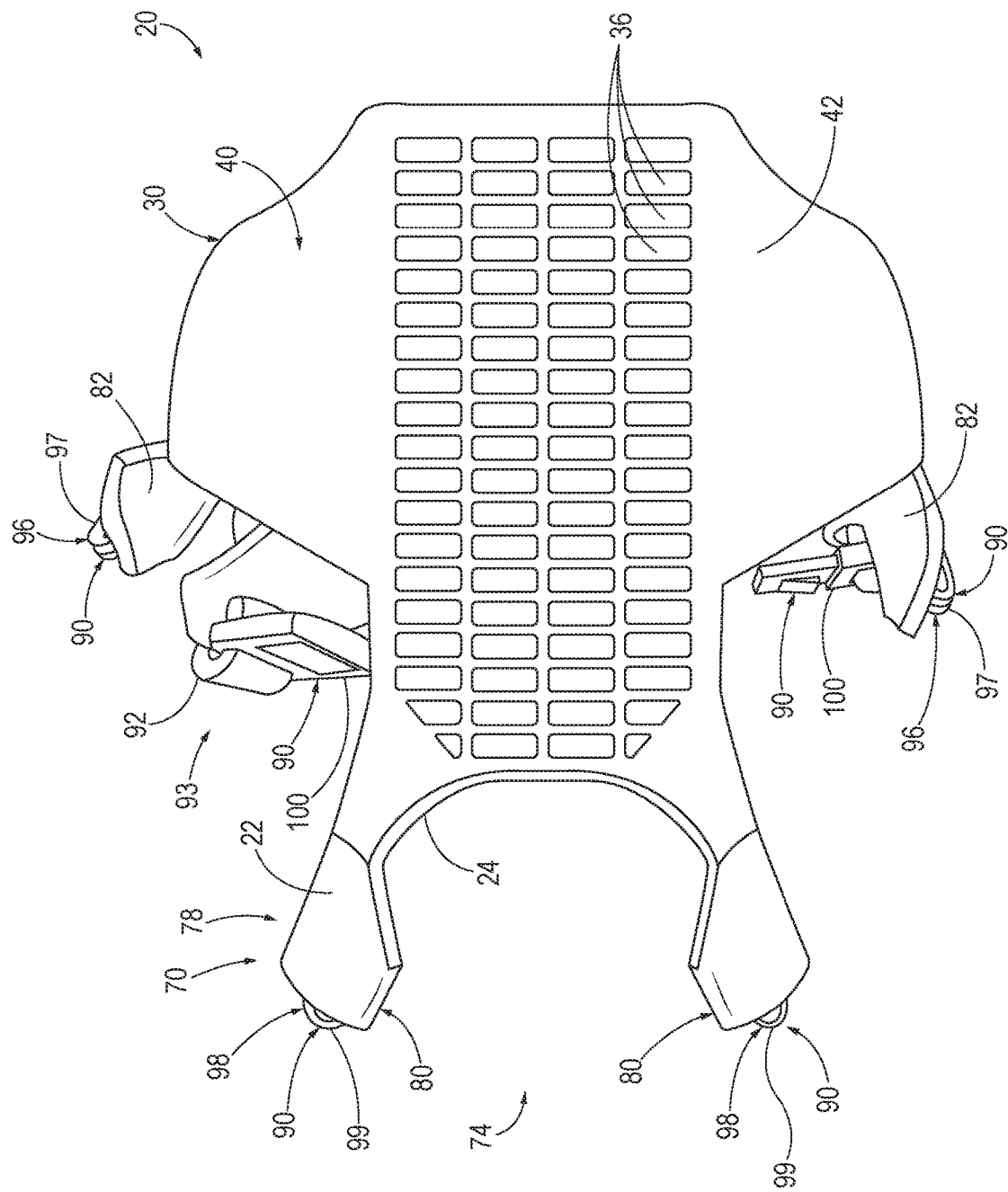
FIG. 7 is a less schematic bottom view illustrating an example of paw-wear in an unfitted configuration, according to the present disclosure.
Figure 8:
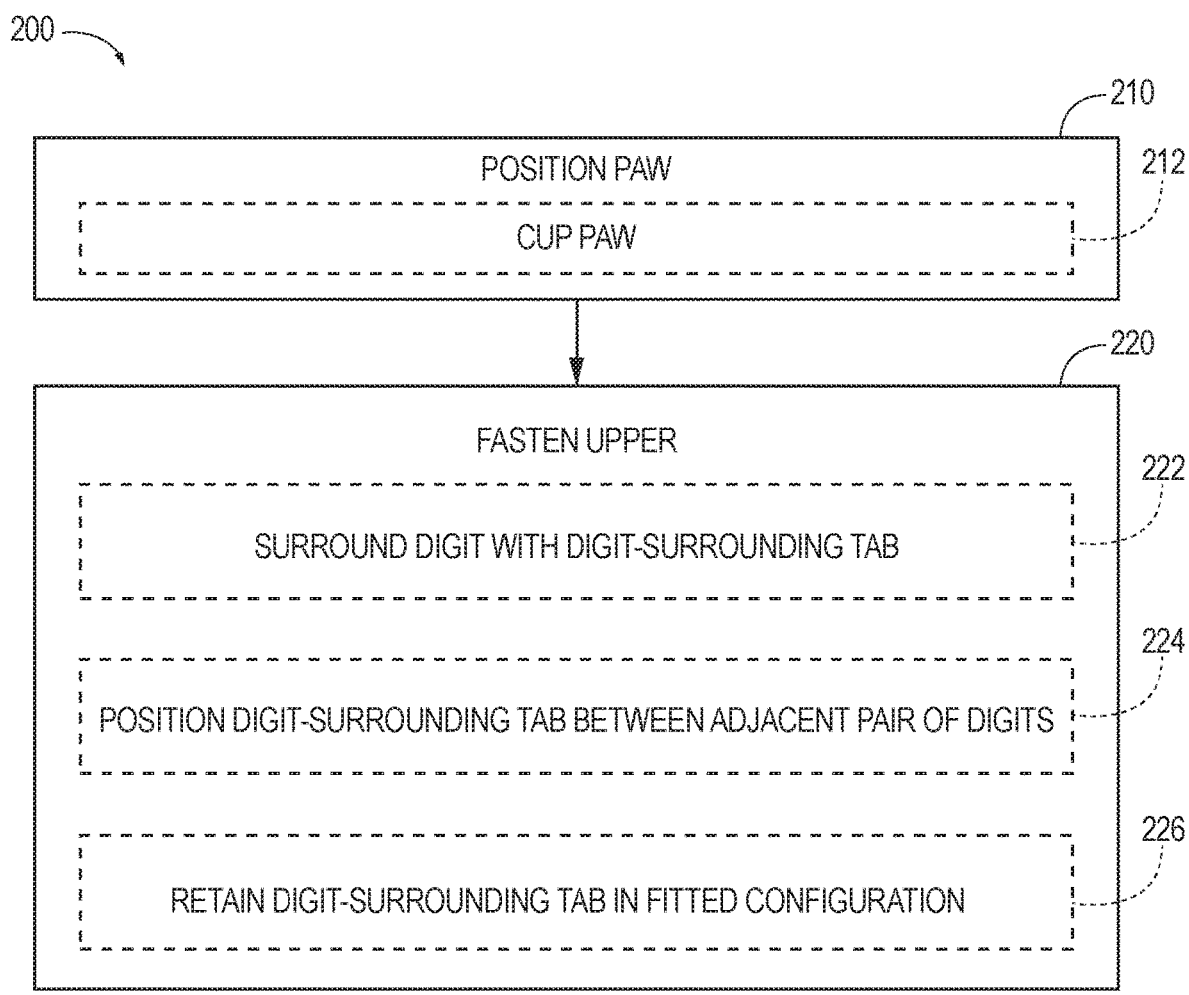
FIG. 8 is a flowchart depicting methods of fitting paw-wear, according to the present disclosure, to a clawed animal.

When paw-wear 20 is utilized by dog 4, and as discussed in more detail herein with reference to methods 200 of FIG. 8, paw-wear 20 initially may be in unfitted configuration 74, as illustrated in FIGS. 1, 3, and 7. In unfitted configuration 74, upper 70 may be shaped to permit paw 8 and/or pads 12 thereof to engage with inner sole surface 50 of sole 30. This engagement may occur without the paw being surrounded, or entirely surrounded, by the upper, without the paw contacting the upper, and/or without the upper retaining the paw-wear on the paw. Stated another way, and in contrast with conventional shoes for humans, paw-wear 20 may be configured such that, when upper 70 is in unfitted configuration 74, the upper permits unobstructed, or at least substantially unobstructed, access to inner sole surface 50 of sole 30 by paw 8.

As an example, and as illustrated in FIGS. 1, 3, and 7, at least a horizontal region 78 of upper 70 may be at least partially planar, may be at least partially flat, and/or may extend radially outward from sole 30 when the upper is in unfitted configuration 74. As illustrated by a combination of solid and dash-dot lines in FIG. 1, horizontal region 78 may, in some examples, include an entirety of upper 70. Alternatively. and as illustrated in solid lines in FIGS. 1 and 3, at least a vertical region 79 of upper 70 may extend upward from sole 30 and/or may at least partially surround paw 8 when the paw is positioned on inner sole surface 50 of sole 30 and paw-wear 20 is in unfitted configuration 74.

Stated another way, unfitted configuration 74 may be configured such that the paw may be positioned within and/or engaged with inner sole surface 50 without, or without the need to, extend the paw into and/or through a tubular region, such as may be common for human footwear. This feature of paw-wear 20 may permit the paw-wear to be fitted to the dog without causing the dog undue stress and/or discomfort that might be caused by inserting and/or sliding the paw into the tubular region. Such undue stress and/or discomfort may be brought about by claws snagging on a material that defines the tubular region and/or uncomfortable ruffling of the dog's fur upon insertion into the tubular region.

Subsequent to paw 8 being positioned on sole 30 and/or on inner sole surface 50 thereof, and as illustrated in FIGS. 2, 5, and 6, upper 70 may be transitioned to fitted configuration 72. The transition from unfitted configuration 74 of FIGS. 1, 3, and 7 to fitted configuration 72 of FIGS. 2, 5, and 6 is discussed in more detail herein. When the upper is in fitted configuration 72, the upper may be shaped to at least partially surround the paw and/or to retain the paw-wear on the paw. As an example, and when in fitted configuration 72, upper 70 may be at least partially tubular, at least a portion of paw 8 may be positioned within a paw-retaining region 73 that may be defined by the upper, upper 70 may at least partially surround the paw, and/or at least a portion of upper 70 may encircle at least a region of the paw.

As illustrated in FIGS. 2 and 6, and when upper 70 is in fitted configuration 72, claws 11 of paw 8 may extend external to the paw-wear and/or may be outside, or external to, paw-retaining region 73. Stated another way, claws 11 may be exposed when the upper is in the fitted configuration, when the upper at least partially surrounds the paw, and/or when the upper retains the paw-wear on the paw. Such a configuration may permit claws 11 to be utilized, or naturally utilized, by the dog, or other clawed animal, while paw-wear 20 is fitted to the dog's paw. Stated another way, paw-wear 20 may not impede the dog's natural ability to utilize its claws for traction, for digging, for stability, and the like while, at the same time, protecting the dog's paw and/or pads 12 of the dog's paw. This feature of paw-wear 20 may be in distinct contrast to conventional footwear for clawed animals, which, as discussed, generally takes the form of balloon-shaped rubber enclosures and/or of footwear that resembles human shoes and/or boots. Such footwear generally retains the clawed animal's claws within the footwear, and the clawed animal is unable to utilize its claws in a natural manner.

In addition to the above, paw-wear 20 may fit snugly and/or tightly to a remainder of paw 8 and/or to a portion of leg 6. This may improve protection afforded to the paws by the presence of paw-wear 20 and/or may improve the dog's stability while utilizing paw-wear 20.

Outer sole surface 40 of sole 30 may include and/or be defined by a resilient ground-contacting material 42 that may be configured to contact, or to directly contact, a ground surface when paw-wear 20 is worn on paw 8 and/or utilized by dog 4. Resilient ground-contacting material 42 may be configured and/or selected to protect pads 12 of paw 8 from abrasion and/or heat. Additionally or alternatively, resilient ground-contacting material 42 also may be configured to protect a remainder of paw-wear 20 from abrasion, tears, gashes, and/or wear. Examples of resilient ground-contacting material 42 include a polymer, an elastomer, and/or latex.

As illustrated in dashed lines in FIGS. 1-2 and in solid lines in FIG. 7, sole 30 may include tread 36. Tread 36 also may be referred to herein as traction bars 36, traction regions 36, and/or traction spray 36 and may include and/or may be sized, shaped, and/or configured to increase traction between paw-wear 20 and the ground surface when the paw-wear is utilized by the dog. Tread 36 may include any suitable structure. As examples, tread 36 may be defined by raised and/or roughened regions of sole 30 that may increase friction and/or traction between the sole and the ground surface.

Returning to FIGS. 1-2, inner sole surface 50 may include a paw-contacting material 54 that may be configured to contact, or to directly contact, paw 8. Paw-contacting material 54, when present, may be configured and/or selected to protect digits 10 and/or palm 18, such as from abrasion and/or heat. Examples of paw-contacting material 54 are disclosed herein with reference to resilient ground-contacting material 42. Additional examples of paw-contacting material 54 include a fabric and/or a woven material.

As discussed, upper 70 may be adapted, configured, designed, sized, and/or shaped to at least partially surround paw 8 and/or to retain paw-wear 20 on paw 8. As also discussed, upper 70 may be configured to transition between unfitted configuration 74, which is illustrated in FIGS. 1, 3, and 7, and fitted configuration 72, which is illustrated in FIGS. 2, 5, and 6.

Upper 70 may include any suitable structure. As an example, upper 70 may include a plurality of digit-surrounding tabs 80. Each digit-surrounding tab 80 may extend from sole 30 and may be shaped to at least partially cover at least one corresponding digit 10 when the upper is in fitted configuration 72.

Digit-surrounding tabs 80 may extend over adjacent digits 10 and/or between adjacent claws 11 of the paw such that the claws extend external paw-wear 20, extend external paw-retaining region 73 of the paw-wear, extend external upper 70 of the paw-wear, and/or extend past sole 30 of the paw-wear. Stated another way, digit-surrounding tabs 80 may be configured such that claws 11 extend between the digit-surrounding tabs, such that the claws extend past the digit-surrounding tabs, and/or such that the claws extend external the paw-wear when upper 70 is in fitted configuration 72. Stated another way, and when in fitted configuration 72, paw-wear 20 may define openings 86, as illustrated in FIGS. 2 and 5-6, and the claws of the clawed animal may extend external to paw-wear 20 via openings 86.

Paw-wear 20 and/or upper 70 thereof further may include a closure mechanism 90. Closure mechanism 90 may be configured to selectively retain upper 70 in fitted configuration 72 and/or to retain paw-wear 20 on the dog's paw. Stated another way, closure mechanism 90 may be configured to retain each digit-surrounding tab 80, when present, in a corresponding fitted orientation 84 when the upper is in fitted configuration 72 of FIGS. 2 and 5-6.

Closure mechanism 90 may include any suitable structure that may, or that may be utilized to, retain upper 70 in fitted configuration 72. As an example, closure mechanism 90 may include at least one retention strap 92. Retention strap 92, when present, may be configured to transition between an unfastened configuration 93, as illustrated in FIGS. 1, 3, and 7, and a fastened configuration 95, as illustrated in FIGS. 2 and 4-6. When in unfastened configuration 93, the retention strap may be configured to permit the paw to be positioned within the paw-wear. When in fastened configuration 95, the retention strap may be configured to encircle, to extend around, and/or to extend at least partially around leg 6 and/or paw 8 of dog 4 and thus to selectively retain paw-wear 20 on the paw. As illustrated in FIGS. 2 and 6, and in some examples, retention strap 92 may encircle leg 6 above, immediately above, and/or proximate paw 8. In some examples, retention strap 92 may encircle leg 6 at and/or proximate a wrist 9 of the leg. Wrist 9 also may be referred to herein as a metacarpal joint or as a metatarsal joint of the leg. Retention strap 92 also may be referred to herein as a wrist strap 92.

In some examples, and as illustrated in FIGS. 1-7, paw-wear 20 and/or closure mechanism 90 thereof may include a clasp 100 that may be configured to selectively retain retention strap 92 in fastened configuration 95. Clasp 100 additionally or alternatively may be configured to permit and/or facilitate adjustment of a length of retention strap 92, such as to permit and/or facilitate fitment of retention strap 92 to differently sized legs 6 and/or paws 8. Examples of other structure(s) that may be utilized to selectively retain retention strap 92 in fastened configuration 95 and/or to adjust the length of the retention strap include a hook and loop fastening structure, a lace, a cord and a cord lock fastening structure, a hook and eye fastening structure, a button and a buttonhole fastening structure, a buckle, a hook and bar fastening structure, and/or a zipper.

In some examples, upper 70 and/or closure mechanism 90 thereof may include at least one retention point 96 and a plurality of engagement structures 98. In one example, upper 70 may include a pair of retention points 96 and each digit-surrounding tab 80 includes at least one engagement structure 98. In another example, one or more digit-surrounding tab 80 may include one or more pairs of engagement structures 98.

Engagement structures 98 are configured to operatively engage with retention points 96 to retain the upper in the fitted configuration. The inclusion of two engagement structures 98 on a given digit-surrounding tab 80 may improve an ability to retain a desired orientation of the digit-surrounding tabs relative to digits 10 and/or paw 8 of the dog. Additionally or alternatively, the inclusion of a single engagement structure 98 on a given digit-surrounding tab 80 may provide additional flexibility for the digit-surrounding tab, may decrease a force applied to the digits of the paw when the upper is in the fitted configuration, and/or may simplify the transition between unfitted configuration 74 and fitted configuration 72. As such, a number of engagement structures 98 associated with a given digit-surrounding tab 80 may be selected based upon a desired amount of stability to be provided by the given digit-surrounding tab.

Retention point 96 and engagement structure 98 may include any suitable structure. As an example, and as illustrated in FIGS. 1-7, retention points 96 may include hooks 97 and engagement structures 98 may include eyes 99 that may be configured to be looped over hooks 97, as discussed in more detail herein with reference to methods 200 of FIG. 8. As another example, retention points 96 may include eyes and engagement structures 98 may include hooks. In some examples, eyes 99 may be operatively attached to and/or may extend from digit-surrounding tabs 80 and/or vertical region 79 of upper 70. In some examples, eyes 99 may be defined by and/or within digit-surrounding tabs 80 and/or vertical region 79 of upper 70. In some examples, a plurality of spaced-apart retention points 96 and/or engagement structures 98 may be utilized to permit and/or facilitate adjustment of a length of digit-surrounding tabs 80.

As perhaps best illustrated in FIGS. 2 and 4-6, and in some examples, retention points 96 may be positioned within a region of upper 70 that contacts, or that directly contacts, paw 8. In other examples, retention points 96 may be positioned within a region of upper 70 that is between retention strap 92 and sole 30. Such a configuration may permit and/or facilitate improved retention of paw 8 by upper 70 and/or by digit-surrounding tabs 80 thereof. Additionally or alternatively, such a configuration may permit digit-surrounding tabs 80, when in fitted configuration 72, to be positioned between claws 11 and/or to permit claws 11 to extend from the upper.

In still other examples, and as illustrated in FIGS. 1 and 4-7, upper 70 may include an extending tab 82, and retention points 96 may be operatively attached to an end, or region, of the extending tab that is distal a remainder of upper 70. In these examples, extending tab 82 may, or may extend from vertical region 79 of upper 70. Also in these examples, extending tab 82 may extend around, at least partially around, over, at least partially over, across, and/or at least partially across digits 10 of paw 8. In such a configuration, extending tab 82 also may be referred to herein as and/or may be a digit-surrounding tab.

Paw-wear 20 may include and/or may be formed from any suitable material and/or materials, including those disclosed herein. In one example, paw-wear 20 may include and/or may be partially defined by a fabric 22. The fabric may at least partially define upper 70 and/or sole 30. When fabric 22 at least partially defines sole 30, resilient ground-contacting material 42 and/or paw-contacting material 54 may coat and/or cover the fabric. Examples of the fabric include a woven fabric, a polyester fabric, and/or a resilient fabric. Fabric 22, when utilized, may be a flexible fabric, a resilient fabric, and/or an elastic fabric. Such fabrics may permit sole 30 and/or upper 70 to stretch and/or to deform, such as to facilitate utilization of a given size of paw-wear on and/or with a range of paw sizes. Resilient ground-contacting material 42 and/or paw-contacting material 54 may be, or may be selected to be flexible, resilient, and/or elastic for similar reasons.

As illustrated, a resilient edge material 24 may coat and/or cover edges and/or a perimeter of fabric 22, such as to increase a strength of the fabric, to decrease abrasion of the fabric, to resist fraying of the fabric, and/or to increase a pulling force that may be applied to digit-surrounding tabs 80. Examples of resilient edge material 24 are disclosed herein with reference to resilient ground-contacting material 42.

FIG. 8 is a flowchart depicting methods 200 of fitting paw-wear, according to the present disclosure, to a clawed animal. Methods 200 include positioning a paw of a dog at 210 and fastening an upper at 220.

Positioning the paw at 210 may include positioning the paw of the dog in contact with an inner sole surface of a sole of the paw-wear. An example of the positioning at 210 is illustrated in FIG. 1. As illustrated therein, paw 8 may be positioned within paw-wear 20 and/or in contact with inner sole surface 50 of the paw-wear. The positioning at 210 may be performed while the upper is in an unfitted configuration. When the upper is in the unfitted configuration and/or during the positioning at 210, at least a horizontal region 78 of upper 70 may extend away from paw 8 and/or may not contact and/or retain the paw, as also illustrated in FIG. 1. Additional examples of the unfitted configuration are disclosed herein.

Fastening the upper at 220 may include fastening to at least partially surround the paw with the upper and/or to selectively retain the paw-wear on the paw with, via, and/or utilizing the upper. As discussed herein, the fastening at 220 may include utilizing a closure mechanism, which may include one or more of a retention strap, a hook and loop fastening structure, a clasp, a retention point, and/or an engagement structure, to retain paw-wear 20 on leg 6 and/or paw 8 of the dog. The fastening at 220 may include transitioning the upper from the unfitted configuration to a fitted configuration. Examples of the fitted configuration are disclosed herein.

As discussed, the upper may include a plurality of digit-surrounding tabs. Under these conditions, the fastening at 220 may include at least partially surrounding at least one digit of the paw with a corresponding digit-surrounding tab in the plurality of digit-surrounding tabs, as indicated at 222. Additionally or alternatively, the fastening at 220 may include positioning a corresponding digit-surrounding tab in the plurality of digit-surrounding tabs between adjacent pairs of digits of the paw, between each adjacent pair of digits of the paw, and/or at least partially around digits of the paw, as indicated at 224.

The fastening at 220 further may include retaining the plurality of digit-surrounding tabs in the fitted configuration, as indicated at 226. The retaining at 226 may include retaining each digit-surrounding tab in the plurality of digit-surrounding tabs with the closure mechanism.

As discussed herein and illustrated in FIG. 2, subsequent to the fastening at 220, claws 11 of the paw may extend external the paw-wear. Stated another way, the fastening at 220 may include fastening such that the claws extend external the paw-wear.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one. B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B. and C," "at least one of A, B, or C," "one or more of A, B, and C," "one or more of A, B, or C," and "A, B, and/or C" may mean A alone, B alone, C alone, A and B together, A and C together, B and C together. A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase. "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of paw-wear and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. Dog paw-wear configured to be worn on a paw of the dog, the paw-wear comprising:
  a sole including an outer sole surface and an inner sole surface, wherein the sole is shaped to receive pads of the paw; and
  an upper shaped to at least partially surround the paw and to selectively retain the paw-wear on the paw.

A2. The paw-wear of paragraph A1, wherein the outer sole surface includes a resilient ground-contacting material configured to directly contact a ground surface when the paw-wear is worn on the paw.

A3. The paw-wear of paragraph A2, wherein the resilient ground-contacting material includes at least one of a polymer, an elastomer, and latex.

A4. The paw-wear of any of paragraphs A1-A3, wherein the inner sole surface includes a paw-contacting material configured to directly contact the paw.

A5. The paw-wear of paragraph A4, wherein the paw-contacting material includes at least one of a polymer, an elastomer, and/or latex.

A6. The paw-wear of any of paragraphs A4-A5, wherein the paw-contacting material includes a fabric.

A7. The paw-wear of any of paragraphs A1-A6, wherein the upper is configured to transition between a fitted configuration and an unfitted configuration, wherein, when the upper is in the fitted configuration, the upper is shaped to at least partially surround the paw and to retain the paw-wear on the paw, and further wherein, when the upper is in the unfitted configuration, the upper is shaped to permit the paw to be engaged with the inner sole surface of the sole, optionally without surrounding the paw, and further optionally without retaining the paw-wear on the paw.

A8. The paw-wear of paragraph A7, wherein, when the upper is in the unfitted configuration, at least a horizontal region of the upper extends radially outward from the sole.

A9. The paw-wear of any of paragraphs A7-A8, wherein, when the upper is in the unfitted configuration, at least a/the horizontal region of the upper is at least partially planar.

A10. The paw-wear of any of paragraphs A7-A9, wherein, when the upper is in the fitted configuration, the upper is at least partially tubular.

A11. The paw-wear of any of paragraphs A7-A10, wherein, when the upper is in the fitted configuration, the upper defines a paw-retaining region shaped to receive and retain the paw.

A12. The paw-wear of any of paragraphs A1-A11, wherein the upper includes a plurality of digit-surrounding tabs, wherein each digit-surrounding tab extends from the sole and/or the upper and is shaped to at least partially cover at least one corresponding digit when the upper is in a/the fitted configuration.

A13. The paw-wear of paragraph A12, wherein the upper further includes a closure mechanism configured to selectively retain the upper in the fitted configuration.

A14. The paw-wear of any of paragraphs A12-A13, wherein the upper further includes a/the closure mechanism configured to selectively retain each digit-surrounding tab in the plurality of digit-surrounding tabs in a corresponding fitted orientation when the upper is in the fitted configuration.

A15. The paw-wear of any of paragraphs A12-A14, wherein the closure mechanism includes a retention strap configured to transition between an unfastened configuration, wherein the retention strap is configured to permit the paw to be positioned within the paw-wear, and a fastened configuration, wherein the retention strap is configured to encircle a leg of the dog.

A16. The paw-wear of paragraph A15, wherein the paw-wear includes a clasp that selectively retains the retention strap in the fastened configuration.

A17. The paw-wear of any of paragraphs A12-A16, wherein the upper includes a retention point, and further wherein each digit-surrounding tab includes a corresponding engagement structure configured to operatively engage with the retention point to retain the upper in a/the fitted configuration.

A18. The paw-wear of paragraph A17, wherein the upper includes a pair of retention points, and further wherein each digit-surrounding tab includes a corresponding pair of engagement structures, wherein each engagement structure in the pair of engagement structures is configured to operatively engage with a corresponding retention point in the pair of retention points.

A19. The paw-wear of any of paragraphs A17-A18, wherein the retention point includes at least one of a hook and an eye.

A20. The paw-wear of any of paragraphs A17-A19, wherein the corresponding engagement structure includes at least one of a corresponding eye and a corresponding hook, optionally wherein the corresponding eye is defined by each digit-surrounding tab, optionally wherein the corresponding eye projects from each digit-surrounding tab, and further optionally wherein the corresponding eye is operatively attached to each digit-surrounding tab.

A21. The paw-wear of any of paragraphs A1-A20, wherein the paw-wear is configured such that, when the upper is in a/the fitted configuration, claws of the paw extend external the paw-wear.

A22. The paw-wear of any of paragraphs A1-A21, wherein a/the plurality of digit-surrounding tabs of the upper extend over adjacent digits of the paw such that the claws extend external the paw-wear.

A23. The paw-wear of any of paragraphs A1-A22, wherein the paw-wear is configured such that the claws of the paw are exposed when the upper at least partially surrounds the paw and retains the paw-wear on the paw.

A24. The paw-wear of any of paragraphs A1-A23, wherein the paw-wear includes a fabric that at least partially defines the upper, optionally wherein the fabric at least partially defines the sole.

A25. The paw-wear of paragraph A24, wherein at least one of:
 (i) a/the resilient ground-contacting material coats the fabric;
 (ii) a/the resilient paw-contacting material coats the fabric; and
 (iii) a/the paw-contacting material is the fabric.

A26. The paw-wear of any of paragraphs A24-A25, wherein the fabric includes at least one of:
 (i) a woven fabric;
 (ii) a polyester fabric; and
 (iii) a resilient fabric.

A27. The paw-wear of any of paragraphs A1-A26, wherein the paw-wear further includes the paw, wherein the paw is received by the sole, and further wherein the upper at least partially surrounds the paw and retains the paw-wear on the paw.

B1. A method of fitting paw-wear to a dog, the method comprising:
 positioning a paw of the dog in contact with an inner sole surface of a sole of the paw-wear; and
 fastening an upper of the paw-wear to at least partially surround the paw with the upper and to selectively retain the paw-wear on the paw with the upper.

B2. The method of paragraph B1, wherein the upper includes a plurality of digit-surrounding tabs.

B3. The method of paragraph B2, wherein the fastening the upper includes at least partially surrounding at least one digit of the paw with a corresponding digit-surrounding tab in the plurality of digit-surrounding tabs.

B4. The method of any of paragraphs B2-B3, wherein the fastening includes at least one of:
 (i) positioning a/the corresponding digit-surrounding tab in the plurality of digit-surrounding tabs between adjacent pairs of digits of the paw;
 (ii) positioning a/the corresponding digit-surrounding tab in the plurality of digit-surrounding tabs between each adjacent pair of digits of the paw; and
 (iii) positioning a/the corresponding digit-surrounding tab in the plurality of digit-surrounding tabs over adjacent pairs of digits of the paw.

B5. The method of any of paragraphs B2-B4, wherein the fastening includes retaining the plurality of digit-surrounding tabs in a fitted configuration.

B6. The method of paragraph B5, wherein the retaining includes retaining each digit-surrounding tab in the plurality of digit-surrounding tabs with a closure mechanism.

B7. The method of any of paragraphs B5-B6, wherein the upper includes a pair of retention points, wherein each digit-surrounding tab in the plurality of digit-surrounding tabs includes a corresponding pair of engagement structures, and further wherein the retaining includes engaging each corresponding pair of engagement structures with the pair of retention points.

B8. The method of any of paragraphs B1-B7, wherein the fastening includes fastening such that claws of the paw extend external the paw-wear.

B9. The method of any of paragraphs B1-B8, wherein the upper is configured to transition between a fitted configuration and an unfitted configuration, wherein, when the upper is in the fitted configuration, the upper is shaped to at least partially surround the paw and to retain the paw-wear on the paw, and further wherein, when the upper is in the unfitted configuration, the upper is shaped to permit the paw to be engaged with the inner sole surface of the sole, optionally without surrounding the paw, and further optionally without retaining the paw-wear on the paw.

B10. The method of paragraph B9, wherein the positioning the paw includes positioning while the upper is in the unfitted configuration.

B11. The method of any of paragraphs B9-B10, wherein the fastening the upper includes transitioning the upper from the unfitted configuration to the fitted configuration.

B12. The method of any of paragraphs B9-B11, wherein, when in the unfitted configuration, at least a horizontal region of the upper extends away from the paw.

B13. The method of any of paragraphs B1-B12, wherein the paw-wear includes the paw-wear of any of paragraphs A1-A29.

INDUSTRIAL APPLICABILITY

The paw-wear and methods disclosed herein are applicable to the animal accessory industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. Paw-wear configured to be worn on a paw of a clawed animal, the paw-wear comprising:
   a sole including an outer sole surface and an inner sole surface, wherein the sole is shaped to receive pads of the paw; and
   an upper shaped to at least partially surround the paw and to selectively retain the paw-wear on the paw, wherein the upper includes a plurality of digit-surrounding tabs that extend over adjacent digits of the paw and directly between adjacent claws of the paw such that all claws on the paw horizontally extend external the paw-wear;
   wherein the paw-wear is configured such that claws of the paw are exposed when the upper at least partially surrounds the paw and retains the paw-wear on the paw;
   wherein the upper is configured to transition between a fitted configuration and an unfitted configuration;
   wherein, when the upper is in the fitted configuration, the upper is shaped to at least partially surround the paw and to retain the paw-wear on the paw;
   wherein, when the upper is in the unfitted configuration, the upper is shaped to permit the paw to be engaged with the inner sole surface of the sole without surrounding the paw and without retaining the paw-wear on the paw;
   wherein the paw-wear is configured such that, when the upper is in the fitted configuration, the claws of the paw extend horizontally past an external periphery of the sole; and further wherein: (i) the plurality of digit-surrounding tabs includes two digit-surrounding tabs; (ii) the paw-wear further includes two extending tabs; (iii) when in the fitted configuration, the two digit-surrounding tabs and the two extending tabs together define three openings; (iv) each opening of the three openings is configured to permit at least one corresponding claw of the paw to extend therethrough and external the paw-wear; (v) each of a first opening of the three openings and a second opening of the three openings is at least partially defined by one digit-surrounding tab of the two digit-surrounding tabs and one extending tab of the two extending tabs; (vi) a third opening of the three openings is at least partially defined by the two digit-surrounding tabs; and (vii) the third opening extends between, and spatially separates, the first opening and the second opening.

2. The paw-wear of claim 1, wherein, when the upper is in the unfitted configuration, at least a horizontal region of the upper extends radially outward from the sole.

3. The paw-wear of claim 1, wherein, when the upper is in the unfitted configuration, at least a horizontal region of the upper is at least partially planar.

4. The paw-wear of claim 1, wherein, when the upper is in the fitted configuration, the upper is at least partially tubular.

5. The paw-wear of claim 1, wherein each digit-surrounding tab extends from the sole and is shaped to at least partially cover at least one corresponding digit when the upper is in the fitted configuration.

6. The paw-wear of claim 5, wherein the upper further includes a closure mechanism configured to selectively retain the upper in the fitted configuration.

7. The paw-wear of claim 6, wherein the closure mechanism includes a retention strap configured to transition between an unfastened configuration, wherein the retention strap is configured to permit the paw to be positioned within the paw-wear, and a fastened configuration, wherein the retention strap is configured to encircle a leg of the clawed animal.

8. The paw-wear of claim 1, wherein the upper includes a retention point, and further wherein each digit-surrounding tab includes a corresponding engagement structure configured to operatively engage with the retention point to retain the upper in the fitted configuration.

9. The paw-wear of claim 1, wherein the outer sole surface is at least partially defined by a resilient ground-contacting material configured to directly contact a ground surface when the paw-wear is worn on the paw.

10. The paw-wear of claim 9, wherein the upper is at least partially defined by a fabric that differs from the resilient ground-contacting material.

11. The paw-wear of claim 9, wherein the resilient ground-contacting material includes at least one of a polymer, an elastomer, and latex.

12. The paw-wear of claim 1, wherein the upper further includes a retention strap configured to transition between an unfastened configuration in which the retention strap is configured to permit the paw to be positioned within the paw-wear and a fastened configuration in which the retention strap is configured to encircle a leg of the clawed animal,
   wherein, when the retention strap is in the fastened configuration and the upper is in the fitted configuration, the paw-wear defines two additional openings, including: (i) a fourth opening through which an upper side of the paw is exposed; and (ii) a fifth opening configured to encircle the leg of the clawed animal.

* * * * *